(12) United States Patent
Hiraoka (10) Patent No.: US 11,629,262 B2
(45) Date of Patent: Apr. 18, 2023

(54) LIQUID COMPOSITION SET, CURED PRODUCT FORMING METHOD, AND LIQUID COMPOSITION

(71) Applicant: RICOH COMPANY, LTD., Tokyo (JP)

(72) Inventor: Takao Hiraoka, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 406 days.

(21) Appl. No.: 16/984,294

(22) Filed: Aug. 4, 2020

(65) Prior Publication Data

US 2021/0102081 A1 Apr. 8, 2021

(30) Foreign Application Priority Data

Oct. 3, 2019 (JP) .............................. JP2019-182665

(51) Int. Cl.
*C09D 11/30* (2014.01)
*C09D 11/107* (2014.01)
*C09D 11/54* (2014.01)

(52) U.S. Cl.
CPC ............ *C09D 11/30* (2013.01); *C09D 11/107* (2013.01); *C09D 11/54* (2013.01)

(58) Field of Classification Search
CPC ........ C09D 11/30; C09D 11/107; C09D 11/54
USPC ....................................................... 524/808
See application file for complete search history.

(56) References Cited

U.S. PATENT DOCUMENTS

2019/0284416 A1 9/2019 Asami et al.
2020/0010662 A1 1/2020 Hiraoka et al.

FOREIGN PATENT DOCUMENTS

| JP | 62-089780 | | 4/1987 |
|---|---|---|---|
| JP | 62089780 U | * | 4/1987 |
| JP | 62-100567 | | 5/1987 |
| JP | 3-087262 | | 4/1991 |
| JP | 6-107988 | | 4/1994 |

* cited by examiner

*Primary Examiner* — Hui H Chin
(74) *Attorney, Agent, or Firm* — Grüneberg and Myers PLLC (57) ABSTRACT

In accordance with some embodiment of the present invention, a liquid composition set is provided. The liquid composition set includes a first liquid composition and a second liquid composition. The first liquid composition comprises: a compound represented by general formula (1):

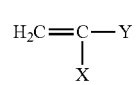

General Formula (1)

where X and Y each independently represent a functional group, and at least one of X and Y represents an electron-withdrawing functional group; and an acidic substance. The second liquid composition comprises a compound having vinyl group or acryloyl group.

14 Claims, 2 Drawing Sheets

LIQUID COMPOSITION SET, CURED PRODUCT FORMING METHOD, AND LIQUID COMPOSITION

CROSS-REFERENCE TO RELATED APPLICATIONS

This patent application is based on and claims priority pursuant to 35 U.S.C. § 119(a) to Japanese Patent Application No. 2019-182665, filed on Oct. 3, 2019 in the Japan Patent Office, the entire disclosure of which is hereby incorporated by reference herein.

BACKGROUND

Technical Field

The present disclosure relates to a liquid composition set, a cured product forming method, and a liquid composition.

Description of the Related Art

There are methods for producing cured products by curing liquid compositions. One such a method is to use a liquid composition that cures upon irradiation of active energy such as UV rays or application of heat.

In the case of an ultraviolet-ray-curable liquid composition, a high-pressure mercury lamp or a metal halide lamp may be used as a light source for emitting ultraviolet rays. These light sources contain mercury, and permanent use thereof is not recommended because there is a risk of leakage of mercury into the environment at the time of discard of the light sources. In recent years, LEDs (light emitting diodes) have been often used as light sources for emitting ultraviolet rays. However, the emission wavelength is limited to long wavelengths in a certain wavelength region, which may result in insufficient curability.

The use of a heat-curable liquid composition is not preferred because a large amount of energy is required for heating.

A curable liquid composition that requires neither active energy ray irradiation nor heating is also known, such as a cyanoacrylate-containing liquid composition generally used in an adhesive.

SUMMARY

In accordance with some embodiment of the present invention, a liquid composition set is provided. The liquid composition set includes a first liquid composition and a second liquid composition. The first liquid composition comprises: a compound represented by general formula (1):

General Formula (1)

where X and Y each independently represent a functional group, and at least one of X and Y represents an electron-withdrawing functional group; and an acidic substance. The second liquid composition comprises a compound having vinyl group or acryloyl group.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

The liquid composition set according to an embodiment of the present invention is curable without application of external energy such as active energy ray irradiation and heating. The curability of the liquid compositions is excellent. The liquid compositions can keep in a stable liquid state before curing, providing excellent handleability and storability.

Hereinafter, embodiments of the present invention are described.

Liquid Composition Set

The liquid composition set of the present embodiment includes a first liquid composition and a second liquid composition. The first liquid composition contains a compound represented by the general formula (1) and an acidic substance. The second liquid composition contains a compound having vinyl group or acryloyl group. The liquid composition set may further include other compositions as required.

The liquid composition set cures when the first liquid composition and the second liquid composition come into contact with each other, forming a cured product. Here, the term "curing" refers to production of a polymer upon contact of the first liquid composition with the second liquid composition. The production of a polymer is not limited to solidification of the liquid composition, and also includes thickening of the liquid composition. The polymer may be a mixture of a solidified product and a thickened product. The cured product is a polymer produced upon contact of the first liquid composition with the second liquid composition. The cured product is not limited to a solid and may be a thickened product or a mixture of a solid and a thickened product.

The case in which a cured product can be formed upon contact of the first liquid composition with the second liquid composition refers to a case in which the cured product is formed only based on the contact of the first liquid composition with the second liquid composition. In other words, it refers to a case in which the cured product can be formed without application of external energy such as active energy ray irradiation and heating. As long as the cured product can be formed only based on the contact of the first liquid composition with the second liquid composition, application of external energy may be additionally performed during the curing, but is preferably not performed. In the present disclosure, the active energy rays refer to ultraviolet rays, electron rays, α-rays, β-rays, γ-rays, and X-rays, but are not limited thereto.

First Liquid Composition

The first liquid composition contains a compound represented by the general formula (1) and an acidic substance, and may further contain other substances as necessary.

Compound Represented by General Formula (1)

The compound represented by the general formula (1) is a polymerizable compound. The compound represented by the general formula (1) undergoes a polymerization reaction with a compound contained in the second liquid composition (described in detail later) when the first liquid composition and the second liquid composition come into contact with each other, forming a cured product. The use of the compound represented by the general formula (1) improves curability.

General Formula (1)

Preferably, at least one of X and Y in the general formula (1) represents an electron-withdrawing functional group. More preferably, both X and Y represent an electron-withdrawing functional group. The electron-withdrawing functional group refers to a functional group capable of strengthening the electron-accepting property of an n-conjugated functional group in a compound when being introduced to the compound. A person skilled in the art can easily recognize such a functional group. Examples of the electron-withdrawing functional group include, but are not limited to, functional groups having a structure of cyano group, nitro group, carboxyl group, carboxylate group, or carbonyl group. Preferred examples of the electron-withdrawing functional group include cyano group, nitro group, carboxyl group, carboxylate group, and carbonyl group. Preferably, the electron-withdrawing functional group has a structure of cyano group. More preferably, the electron-withdrawing functional group is cyano group. When the electron-withdrawing functional group is cyano group, curability is improved.

Specific examples of the compound represented by the general formula (1) include, but are not limited to: methylene malonate compounds in which X and Y are each independently carboxyl group or carboxylate group; cyanoacrylate compounds in which one of X and Y is cyano group and the other is carboxyl group or carboxylate group; vinylidene cyanide in which X and Y are cyano groups; and nitroethylene in which one of X and Y is nitro group. Among these, cyanoacrylate compounds are preferred. When the compound represented by the general formula (1) is a cyanoacrylate compound, curability is improved. The cyanoacrylate compound is a widely used material also known as a main component of instant adhesives. The cyanoacrylate compound is easily available as a mass-produced industrial product and is also preferred for its low toxicity and low odor.

Examples of the methylene malonate compounds include, but are not limited to: methylene malonate; dialkyl methylene malonates such as diethyl methylene malonate, dimethyl methylene malonate, dibutyl methylene malonate, and diisobutyl methylene malonate; dialkoxyalkyl methylene malonates such as di(methoxyethyl) methylene malonate, di(ethoxyethyl) methylene malonate, di(butoxyethyl) methylene malonate, di(methoxybutyl) methylene malonate, di(ethoxybutyl) methylene malonate, and di(butoxybutyl) methylene malonate; and di(acetoxyalkyl) methylene malonates such as di(acetoxyethyl) methylene malonate and di(acetoxybutyl) methylene malonate. In addition to these, methylene malonate compounds having a carboxylate structure, which is similar to the structure of acrylate compounds used for various industrial products, can be used. Furthermore, polyfunctional methylene malonate compounds having a plurality of intramolecular polymerizable double bonds can also be used.

Examples of the cyanoacrylate compounds include, but are not limited to: cyanoacrylate; alkyl cyanoacrylates having a straight-chain, branched, or cyclic structure, such as methyl cyanoacrylate, ethyl cyanoacrylate, propyl cyanoacrylate, isopropyl cyanoacrylate, butyl cyanoacrylate, isobutyl cyanoacrylate, t-butyl cyanoacrylate, hexyl cyanoacrylate, octyl cyanoacrylate, and phenylethyl cyanoacrylate; alkoxyalkyl cyanoacrylates such as methoxyethyl cyanoacrylate, ethoxyethyl cyanoacrylate, butoxyethyl cyanoacrylate, methoxybutyl cyanoacrylate, ethoxybutyl cyanoacrylate, and butoxybutyl cyanoacrylate; and acetoxyalkyl cyanoacrylates such as acetoxyethyl cyanoacrylate and acetoxybutyl cyanoacrylate. In addition to these, cyanoacrylate compounds having a carboxylate structure, which is similar to the structure of acrylate compounds used for various industrial products, can be used. Furthermore, polyfunctional cyanoacrylate compounds having a plurality of intramolecular polymerizable double bonds can also be used.

The proportion of the compound represented by the general formula (1) in the first liquid composition is preferably 50.0% by mass or more, more preferably 60.0% by mass or more, much more preferably 70.0% by mass or more, further preferably 80.0% by mass or more, and particularly preferably 90.0% by mass or more. Further, it is preferably 99.99% by mass or less.

Acidic Substance

The acidic substance refers to a substance that the aqueous solution or liquid dispersion thereof, in which the substance is dissolved or dispersed in water, shows acidity.

Examples thereof include organic acids and inorganic acids. Not only free acids but also acid anhydrides, acid chlorides, and solid acids can also be used as long as they are acidic under the above-described conditions.

The acidic substance suppresses curing of the compound represented by the general formula (1) in the first liquid composition. The compound represented by the general formula (1) may rapidly undergo a curing reaction upon contact with the air. As an example, cyanoacrylate compounds are thus widely known as a main component of instant adhesives. More specifically, the compound represented by the general formula (1) may undergo an anionic polymerization upon contact with moisture in the air, and the acidic substance thus suppresses that polymerization. Although containing the compound represented by the general formula (1), the first liquid composition can keep in a liquid state for a long period of time without curing. Therefore, the liquid composition set of the present embodiment provides excellent handleability and a wide range of applications. For example, the first liquid composition can sufficiently spread before formation of the cured product since immediate formation of a cured product after application of the first liquid composition is suppressed. The resulting cured product will be therefore very uniform in surface properties and film thickness. In the case of applying the first liquid composition by an inkjet system, discharge nozzles and flow channels are prevented from being clogged with the cured product. Furthermore, storage stability of the first liquid composition is excellent for an extended period of time.

The acidic substance is not particularly limited as long as it is capable of suppressing the compound represented by the general formula (1) in the first liquid composition from undergoing a polymerization reaction. Examples thereof include, but are not limited to, hydrochloric acid, nitric acid, sulfuric acid, sulfur dioxide, sultone compounds such as propane sultone, carboxylic acid compounds such as acetic acid and propionic acid, sulfonic acid compounds, and phosphoric acid compounds. Here, the carboxylic acid compounds, the sulfonic acid compounds, and the phosphoric acid compounds respectively include polymer compounds having carboxyl group, polymer compounds having sulfo group, and polymer compounds having phosphate group.

The acidic substance may have a polymerizable functional group as long as a cured product is not formed when mixed with the compound represented by the general formula (1). Examples of the polymerizable functional group that does not allow the compound represented by the general formula (1) to form a cured product when mixed with the acidic substance include, but are not limited to, methacryloyl group. The acidic substance having such a polymerizable functional group may also be methylene malonate or cyanoacrylate, which are described above as examples of the compound represented by the general formula (1).

The vapor pressure of the acidic substance is preferably 0.4 Pa or less at 20 degrees C. Some acidic substances have peculiar irritating odor, but those having a low vapor pressure tend to have less irritating odor. Examples of the acidic substance having a vapor pressure of 0.4 Pa or less at 20 degrees C. include, but are not limited to, lactic acid (0.4 Pa). Further, acidic substances having methacryloyl group also tend to have a low vapor pressure. Depending on the use application of the liquid composition, it may be necessary to suppress generation of odor. In such cases, an acidic substance having a low vapor pressure at 20 degrees C. is preferably used.

The proportion of the acidic substance in the first liquid composition is preferably 0.1% by mass or more, more preferably 0.5% by mass or more, further preferably 0.8% by mass or more, and particularly preferably 1.0% by mass or more. In addition, it is preferably 20.0% by mass or less, more preferably 15.0% by mass or less, further preferably 12.0% by mass or less, and particularly preferably 10.0% by mass or less. When the proportion is 0.1% by mass or more, the first liquid composition can keep in a stable liquid state before curing, providing excellent handleability and storability. When the proportion is 20.0% by mass or less, the curability upon contact of the first liquid composition with the second liquid composition is improved. The acidic substance having methacryloyl group is preferred because it is capable of maintaining high curability even when the proportion thereof is increased.

Physical Properties of First Liquid Composition

The first liquid composition is reliably suppressed, for an extended period of time, from increasing the viscosity and undergoing curing even when it comes into contact with the air, thus keeping in a substantially constant liquid state. Accordingly, in the case of applying the first liquid composition by an inkjet system, discharge nozzles and flow channels are prevented from being clogged with the cured product. Furthermore, storage stability of the first liquid composition is excellent for an extended period of time.

One physical property for indicating that the first liquid composition is in a stable state for an extended period of time is the rate of change in viscosity (hereinafter "viscosity change rate"). The viscosity change rate of the first liquid composition is preferably 5.0% or less, more preferably 3.0% or less, and further preferably 1.0% or less. The viscosity change rate is determined from the following formula, when 50 mL of the first liquid composition is put in a 110-mL container (e.g., a brown glass screw tube bottle No. 8 available from AS ONE Corporation) and sealed therein while being in contact with an air having a temperature of 25 degrees C. and a relative humidity of 50%, and the container is then left to stand at 25 degrees C. for 1 day (24 hours). The viscosity can be measured at a temperature of 25 degrees C. using a commercially available viscometer such as an E-type viscometer TVE-22L available from Toki Sangyo Co., Ltd. The first liquid composition subjected to the measurement of viscosity change rate is not limited to one immediately after production and may be one being sealed in a container after production and put in the market for sale. When measuring the viscosity change rate of one put in the market, it is preferable to start the measurement immediately after the opening of the container.

Viscosity change rate (%)={(Viscosity after being left)−(Viscosity before being left)}/(Viscosity before being left)×100

It is preferable that the viscosity change rate be 5.0% or less even when the container is left to stand for 7 days (168 hours) in place of 1 day (24 hours). It is more preferable that the viscosity change rate be 5.0% or less even when the container is left to stand for 30 days (720 hours).

The viscosity of the first liquid composition is preferably 1 mPa·s or more and 30 mPa·s or less, more preferably 2 mPa·s or more and 25 mPa·s or less, at a temperature of 25 degrees C. When the viscosity is within the above range, the first liquid composition exhibits good dischargibility when applied by an inkjet method.

Second Liquid Composition

The second liquid composition contains a compound having vinyl group or acryloyl group, and may further contain other substances as necessary.

Compound Having Vinyl Group or Acryloyl Group

The compound having vinyl group or acryloyl group undergoes a polymerization reaction with the compound represented by the general formula (1) when the first liquid composition and the second liquid composition come into contact with each other, forming a cured product. More specifically, the compound represented by the general formula (1) that is suppressed from undergoing an anionic polymerization by the acidic substance undergoes a radical polymerization reaction with the compound having vinyl group or acryloyl group, forming a cured product. The liquid composition set according to the present embodiment is thus capable of forming a cured product without application of external energy such as active energy ray irradiation and heating. Moreover, even when the first liquid composition and the second liquid composition are substantially free of polymerization initiator, a cured product can be formed. The polymerization initiator is a substance that, when applied with external energy, absorbs the external energy to generate radicals or ions to initiate a polymerization of a polymerizable compound. The polymerization initiator may cause odor not only during the curing reaction but also in the cured product resulted by the reaction. Further, the decomposition product of the polymerization initiator may be toxic. The liquid composition set of the present embodiment can avoid such problems relating to odor and toxicity by being substantially free of polymerization initiator. It is preferable that the liquid composition set be substantially free of polymerization initiator, but may contain a polymerization initiator. The first liquid composition and the second liquid composition being substantially free of polymerization initiator preferably refers to those in which the proportion of polymerization initiator is equal to or less than the detection limit, more preferably to those from which no polymerization initiator is detected.

The compound having vinyl group is not particularly limited as long as it can undergo a polymerization reaction with the compound represented by the general formula (1) to form a cured product. Examples thereof include, but are not limited to, vinyl ether compounds, styrene compounds, N-vinyl compounds, vinyl carboxylate compounds, and diene compounds. Among these, vinyl ether compounds and N-vinyl compounds are preferred.

Examples of the vinyl ether compounds include, but are not limited to, hydroxyethyl vinyl ether, hydroxybutyl vinyl ether, propyl vinyl ether, isopropyl vinyl ether, butyl vinyl ether, isobutyl vinyl ether, hexyl vinyl ether, octyl vinyl ether, 2-ethylhexyl vinyl ether, cyclohexyl vinyl ether, allyl vinyl ether, (hydroxymethyl)cyclohexyl vinyl ether, 2-(2-vinyloxyethoxy)ethyl (meth)acrylate, ethylene glycol divinyl ether, diethylene glycol divinyl ether, triethylene glycol divinyl ether, polyethylene glycol divinyl ether, propylene glycol divinyl ether, dipropylene glycol divinyl ether, tripropylene glycol divinyl ether, polypropylene glycol divinyl ether, trimethylolpropane trivinyl ether, pentaerythritol trivinyl ether, pentaerythritol tetravinyl ether, ditrimethylolpropane trivinyl ether, ditrimethylolpropane tetravinyl ether, dipentaerythritol pentavinyl ether, and dipentaerythritol hexavinyl ether.

Examples of the styrene compounds include, but are not limited to: styrene; compounds having a substituent on the phenyl group, such as aminostyrene, methylstyrene, ethylstyrene, chlorostyrene, bromostyrene, and fluorostyrene; and polyfunctional compounds having a plurality of intramolecular polymerizable double bonds, such as divinylbenzene.

Examples of the N-vinyl compounds include, but are not limited to, N-vinylcaprolactam, N-vinylpyrrolidone, N-vinylformamide, and 3-ethenyl-5-methyl-2-oxazolidinone.

Examples of the vinyl carboxylate compounds include, but are not limited to, vinyl acetate, vinyl butyrate, vinyl pivalate, and divinyl adipate.

Examples of the diene compounds include, but are not limited to, butadiene, isoprene, and chloroprene.

The compound having acryloyl group is not particularly limited as long as it can undergo a polymerization reaction with the compound represented by the general formula (1) to form a cured product. Examples thereof include, but are not limited to, acrylate compounds and acrylamide compounds. Vinyl ketone compounds can also be used because they contain the same structure as acryloyl group.

Examples of the acrylate compounds include, but are not limited to: compounds such as isostearyl acrylate, stearyl acrylate, isobornyl acrylate, lauryl acrylate, isoamyl acrylate, cyclohexyl acrylate, formalized trimethylolpropane monoacrylate, benzyl acrylate, (2-methyl-2-ethyl-1,3-dioxolan-4-yl)methyl acrylate, phenyl acrylate, Y-butyrolactone acrylate, tetrahydrofurfuryl acrylate, phenoxyethyl acrylate, benzyl acrylate, dicyclopentenyl acrylate, dicyclopentanyl acrylate, dicyclopentenyloxyethyl acrylate, 4-t-butyl-cyclohexyl acrylate, 3,3,5-trimethylcyclohexyl acrylate, isodecyl acrylate, octyl acrylate, isooctyl acrylate, caprolactone acrylate, nonylphenol acrylate, 2-hydroxyphenylphenol acrylate, 2-acryloyloxyethyl succinic acid, 2-acryloyloxyethyl tetrahydrophthalic acid, 2-acryloyloxyethyl hexahydrophthalic acid, 2-acryloyloxypropyl succinic acid, 2-acryloyloxypropyl tetrahydrophthalic acid, 2-acryloyloxypropyl hexahydrophthalic acid, 2-hydroxy-3-methacryloylpropyl acrylate, dimethylaminoethyl acrylate, dimethylaminopropyl acrylate, 2-(2-vinyloxyethoxy)ethyl acrylate, and 2-hydroxy-3-phenoxypropyl acrylate; alkylene-glycol-modified products such as ethylene-glycol-modified products and propylene-glycol-modified products of these compounds; and caprolactone-modified products of these compounds.

Examples of the acrylate compounds further include: monoacrylates such as ethylene glycol acrylate, diethylene glycol acrylate, triethylene glycol acrylate, polyethylene glycol acrylate, propylene glycol acrylate, dipropylene glycol acrylate, tripropylene glycol acrylate, polypropylene glycol acrylate, methoxyethylene glycol acrylate, methoxydiethylene glycol acrylate, methoxytriethylene glycol acrylate, methoxypolyethylene glycol acrylate, methoxypropylene glycol acrylate, methoxydipropylene glycol acrylate, methoxytripropylene glycol acrylate, and methoxypolypropylene glycol acrylate; compounds such as dioxane glycol diacrylate, tricyclodecane dimethanol diacrylate, bisphenol A diacrylate, bisphenol F diacrylate, butanediol diacrylate, hexanediol diacrylate, octanediol diacrylate, nonanediol diacrylate, decanediol diacrylate, dodecanediol diacrylate, hexadecanediol diacrylate, neopentyl glycol diacrylate, isocyanurate diacrylate, and neopentyl glycol hydroxypivalate diacrylate; alkylene-glycol-modified products such as ethylene-glycol-modified products and propylene-glycol-modified products of these compounds; and caprolactone-modified products of these compounds.

Examples of the acrylate compounds further include: diacrylates such as ethylene glycol diacrylate, diethylene glycol diacrylate, triethylene glycol diacrylate, polyethylene glycol diacrylate, propylene glycol diacrylate, dipropylene glycol diacrylate, tripropylene glycol diacrylate, and polypropylene glycol diacrylate.

Examples of the acrylate compounds further include: compounds such as isocyanurate triacrylate, trimethylolpropane triacrylate, glycerin triacrylate, pentaerythritol triacrylate, pentaerythritol tetraacrylate, ditrimethylolpropane triacrylate, ditrimethylolpropane tetraacrylate, dipentaerythritol pentaacrylate, and dipentaerythritol hexaacrylate; alkylene-glycol-modified products such as ethylene-glycol-modified products and propylene-glycol-modified products of these compounds; and caprolactone-modified products of these compounds.

Thus, monoacrylates, diacrylates, and polyfunctional acrylates can be appropriately used as the acrylate compounds. In addition, acrylate oligomers such as hyper-branched acrylate, dendrimer acrylate, polyester acrylate, polyurethane acrylate, epoxy acrylate, and polybutadiene acrylate can also be used.

Examples of the acrylamide compounds include, but are not limited to, acryloylmorpholine, dimethylacrylamide, diethylacrylamide, methylacrylamide, ethylacrylamide, isopropylacrylamide, hydroxyethylacrylamide, dimethylaminoethylacrylamide, dimethylaminopropylacrylamide, and methylenebisacrylamide.

The viscosity of the second liquid composition is preferably 1 mPa·s or more and 30 mPa·s or less, and more preferably 2 mPa·s or more and 25 mPa·s or less, at a temperature of 25 degrees C. When the viscosity is within the above range, the second liquid composition exhibits good dischargibility when applied by an inkjet method.

Other Components in Each Liquid Composition

When at least one of the first liquid composition and the second liquid composition is used as an ink, a colorant may be contained in the ink as necessary. The colorant is not particularly limited, and inorganic pigments, organic pigments, and dyes may be used.

Specific examples of black pigments include, but are not limited to, carbon blacks produced by furnace methods or channel methods.

Examples of yellow pigment include, but are not limited to, Pigment Yellow 1, Pigment Yellow 2, Pigment Yellow 3, Pigment Yellow 12. Pigment Yellow 13, Pigment Yellow 14, Pigment Yellow 16, Pigment Yellow 17, Pigment Yellow 73, Pigment Yellow 74, Pigment Yellow 75, Pigment Yellow 83, Pigment Yellow 93, Pigment Yellow 95, Pigment Yellow 97, Pigment Yellow 98, Pigment Yellow 114, Pigment Yellow 120, Pigment Yellow 128, Pigment Yellow 129, Pigment Yellow 138, Pigment Yellow 150, Pigment Yellow 151, Pigment Yellow 154, Pigment Yellow 155, Pigment Yellow 180, and Pigment Yellow 185.

Examples of magenta pigments include, but are not limited to, Pigment Red 5, Pigment Red 7, Pigment Red 12. Pigment Red 48 (Ca), Pigment Red 48 (Mn), Pigment Red 57 (Ca), Pigment Red 57:1, Pigment Red 112, Pigment Red 122, Pigment Red 123, Pigment Red 168, Pigment Red 184, Pigment Red 202, and Pigment Violet 19.

Examples of cyan pigments include, but are not limited to, Pigment Blue 1, Pigment Blue 2, Pigment Blue 3, Pigment Blue 15, Pigment Blue 15:3, Pigment Blue 15:4, Pigment Blue 16, Pigment Blue 22, Pigment Blue 60, Vat Blue 4, and Vat blue 60.

Examples of white pigments, which may be also used as colorless fillers for property reformation, include, but are not limited to, alkaline-earth metal sulfates (e.g., barium sulfate), alkaline-earth metal carbonates (e.g., calcium carbonate), fine powders of silicic acid, silicas (e.g., synthetic silicate), calcium silicates, aluminas, alumina hydrates, titanium oxides, zinc oxides, talc, and clay.

At least one of the first liquid composition and the second liquid composition may contain a polymerization inhibitor and/or a surfactant, if necessary, as long as the first liquid composition can keep in a substantially constant liquid state and a cured product can be formed when the first liquid composition and the second liquid composition come into contact with each other.

Specific examples of the polymerization inhibitor include, but are not limited to, 4-methoxy-1-naphthol, methyl hydroquinone, hydroquinone, t-butyl hydroquinone, di-t-butyl hydroquinone, methoquinone, 2,2'-dihydroxy-3,3'-di(α-methylcyclohexyl)-5,5'-dimethyldiphenylmethane, p-benzoquinone, di-t-butyl diphenylamine, 9,10-di-n-butoxyanthracene, and 4,4'-[1,10-dioxo-1,10-decanediylbis(oxy)]bis[2,2,6,6-tetramethyl]-1-piperidinyloxy. It is preferable not to add an ionic polymerization inhibitor which is an alkali to the first liquid composition.

Specific examples of the surfactant include, but are not limited to: higher fatty acid esters having polyether, amino group, carboxyl group, or hydroxyl group; polydimethylsiloxane compounds having polyether, amino group, carboxyl group, or hydroxyl group in a side chain or at a terminal; and fluoroalkyl compounds having polyether, amino group, carboxyl group, or hydroxyl group.

Use Application

The use application of the liquid composition set according to an embodiment of the present invention can be suitably selected to suit to a particular application, and can be applied to, for example, modeling resins, paints, adhesives, insulating materials, release agents, coating materials, sealing materials, various resists, and various optical materials.

Furthermore, the liquid composition set can be used as an ink set or an inkjet ink set for forming two-dimensional characters and images and design coating films on various substrates, as well as a three-dimensional object fabricating material set for fabricating three-dimensional images (three-dimensional objects). The three-dimensional object fabricating material set can be used as a modeling material and a supporting material for use in additive manufacturing.

Ink Set

The liquid composition set can be made into an ink set when at least one of the first liquid composition and the second liquid composition is an ink.

Inkjet Ink Set

The liquid composition set can be made into an inkjet ink set when at least one of the first liquid composition and the second liquid composition is an ink to be discharged by an inkjet method.

Accommodating Container Set

The accommodating container set according to an embodiment of the present invention can be produced by accommodating the first liquid composition and the second liquid composition in a first accommodating container and a second accommodating container, respectively. Accordingly, the first accommodating container refers to a container accommodating the first liquid composition, and the second accommodating container refers to a container accommodating the second liquid composition. Thus, the user in transporting or replacing the liquid compositions need not directly touch the liquid compositions, preventing the user's fingers and clothes from being contaminated with the liquid compositions. In addition, the accommodating container set prevents foreign substances from being mixed into the liquid compositions.

Figure 1:
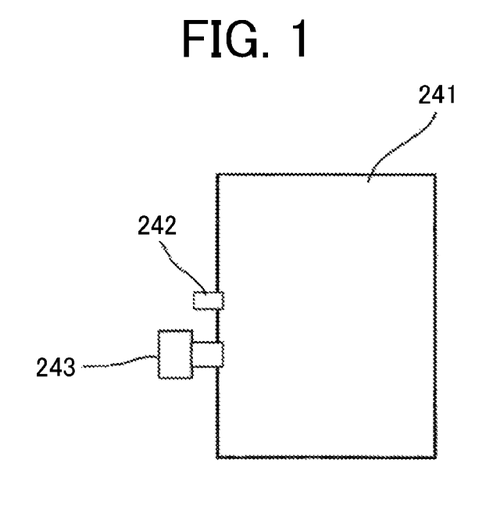
FIG. 1 is a schematic diagram illustrating an accommodating bag that constitutes a part of an accommodating container according to an embodiment of the present invention.
Figure 2:
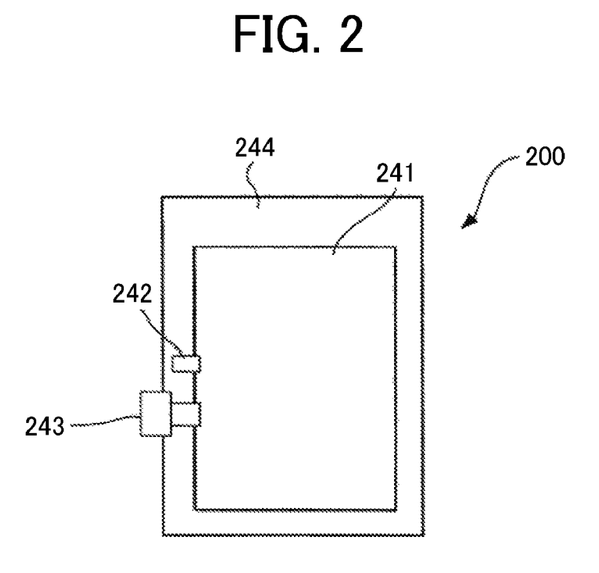
FIG. 2 is a schematic diagram illustrating an accommodating container according to an embodiment of the present invention, accommodating the accommodating bag in a cartridge case.

The accommodating container is described in detail below with reference to FIGS. 1 and 2. FIG. 1 is a schematic diagram illustrating an accommodating bag 241 that constitutes a part of an accommodating container. FIG. 2 is a schematic diagram illustrating an accommodating container 200 accommodating the accommodating bag 241 illustrated in FIG. 1 in a cartridge casing 244.

Referring to FIG. 1, the accommodating bag 241 is filled with the liquid composition through an injection port 242. After the air remaining in the accommodating bag 241 is exhausted, the injection port 242 is sealed by fusion. When the accommodating bag 241 is put into use, a discharge port 243 made of a rubber material is pricked with a needle of an apparatus body so that the liquid composition can be supplied to the apparatus body. The accommodating bag 241 is made of a wrapping material having no air permeability, such as an aluminum laminate film.

Cured Product Forming Apparatus and Cured Product Forming Method

The cured product forming apparatus according to an embodiment of the present invention includes a first applying device configured to apply the first liquid composition and a second applying device configured to apply the second liquid composition, and may further include other devices as necessary. The apparatus brings the first liquid composition applied by the first applying device and the second liquid composition applied by the second applying device into contact with each other to form a cured product. At this time, the second liquid composition may be brought into contact with the previously-applied first liquid composition to form a cured product. Alternatively, the first liquid composition may be brought into contact with the previously-applied second liquid composition to form a cured product. Yet alternatively, the first liquid composition and the second liquid composition may be simultaneously applied and brought into contact with each other to form a cured product. It is preferable that the apparatus be free of device for applying external energy when forming a cured product.

The cured product forming method according to an embodiment of the present invention brings the first liquid composition applied in a first applying step and the second liquid composition applied in a second applying step into contact with each other to form a cured product. At this time, the second liquid composition may be brought into contact with the previously-applied first liquid composition to form a cured product. Alternatively, the first liquid composition may be brought into contact with the previously-applied second liquid composition to form a cured product. Yet alternatively, the first liquid composition and the second liquid composition may be simultaneously applied and brought into contact with each other to form a cured product. It is preferable that the method be free of step for applying external energy when forming a cured product.

The applying step and the applying device may be of, for example, an inkjet method, blade coating, gravure coating, bar coating, roll coating, dip coating, curtain coating, slide coating, die coating, or spray coating. Among these, an inkjet method is preferred.

Figure 3:
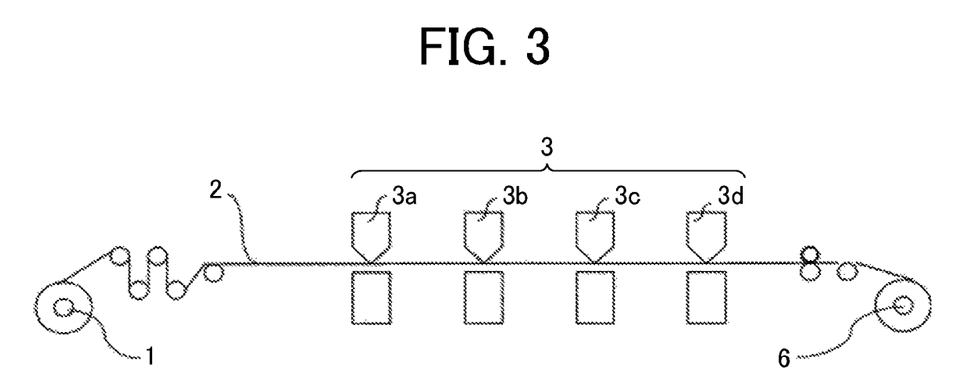
FIG. 3 is a schematic diagram illustrating a cured product forming apparatus according to an embodiment of the present invention.

The cured product forming apparatus and the cured product forming method are described in detail below with reference to FIG. 3. FIG. 3 is a schematic diagram illustrating the cured product forming apparatus according to an embodiment of the present invention.

The cured product forming apparatus illustrated in FIG. 3 includes a feeder 1, a conveyance path 2, a discharge unit 3, and a winder 6. The feeder 1 feeds a base material stored therein. The conveyance path 2 is a path through which the base material is conveyed. The discharge unit 3 includes a first discharger and a second discharger for respectively discharging the first liquid composition and the second liquid composition to the base material. The winder 6 winds and stores the base material.

The feeder 1 feeds out the sheet-like base material stored in a roll along the conveyance path 2. The base material is not particularly limited. Examples thereof include, but are not limited to, paper, glass, ceramics, wood, plastics, and metals.

The conveyance path 2 is a path through which the base material fed from the feeder 1 is conveyed, and the discharge unit 3 is provided on the path.

The discharge unit 3 includes a plurality of discharge devices each including the first discharger and the second discharger, serving as the first applying device configured to discharge the first liquid composition and the second applying device configured to discharge the second liquid composition, respectively, to the base material. The first discharger and the second discharger are examples of devices that execute the first applying step and the second applying step, respectively. A plurality of discharge devices 3a, 3b, 3c, and 3d may be ink discharge devices that sequentially form a yellow image, a magenta image, a cyan image, and a black image, respectively. Each of the discharge devices 3a, 3b, 3c, and 3d discharges the first liquid composition and the second liquid composition and brings them into contact with each other to form a cured product on the base material.

The winder 6 winds up and houses the base material on which the cured product is formed.

EXAMPLES

Further understanding of the present disclosure can be obtained by reference to certain specific examples provided herein below for the purpose of illustration only and are not intended to be limiting.

Preparation of Liquid Composition Set

Examples 1 to 51 and Comparative Examples 1 to 3

The materials described in Tables 1 to 3 were stir-mixed, then filtered through a 1-μm membrane filter, to prepare a first liquid composition. Similarly, the materials described in Tables 1 to 3 were stir-mixed, then filtered through a 1-μm membrane filter, to prepare a second liquid composition. According to the descriptions in Tables 1 to 3, the first liquid composition and the second liquid composition were combined to prepare liquid composition sets of Examples 1 to 51 and Comparative Examples 1 to 3.

The unit for each numerical value in Tables 1 to 3 is "% by mass".

The symbols given to the materials listed in Tables 1 to 3 represent the following compounds or substances.

—First Liquid Composition—
  A: Methylene malonate compound
  B: Cyanoacrylate compound
  C: Vinylidene cyanide
  D: Nitroethylene
  E: Acidic substance
—Second Liquid Composition—
  F: Compound having vinyl group (Vinyl ether compound)
  F': Compound having vinyl group and acryloyl group
  G: Compound having vinyl group (Styrene compound)

H: Compound having acryloyl group (Acrylate compound)

I: Compound having acryloyl group (Acrylamide compound)

J: Compound having vinyl group (N-vinyl compound)

The details of each material listed in Tables 1 and 2 are as follows.

—Compound Represented by General Formula (1) in First Liquid Composition—

A1: Diethyl methylene malonate (X=—COOEt, Y=—COOEt, manufactured by Sigma-Aldrich Co. LLC)

B1: Ethyl cyanoacrylate (X=—CN, Y=—COOEt, manufactured by Taoka Chemical Company, Limited)

B2: Isobutyl cyanoacrylate (X=—CN, Y=—COO(iso-Bu), manufactured by Toagosei Co., Ltd.)

B3: Ethoxyethyl cyanoacrylate (X=—CN, Y=—COOC$_2$H$_4$—O-Et, manufactured by Toagosei Co., Ltd.)

C1: Vinylidene cyanide (X=—CN, Y=—CN, manufactured by Zhengzhou JACS Chem Co, Ltd.)

D1: Nitroethylene (X=—H, Y=—NO$_2$, manufactured by Santa Cruz Biotechnology, Inc.)

—Acidic Substance in First Liquid Composition—

E1: Acetic acid (manufactured by Tokyo Chemical Industry Co., Ltd.)

E2: Lactic acid (manufactured by Tokyo Chemical Industry Co., Ltd.)

E3: Methacryloyloxyethyl phosphate (LIGHT ESTER P-2M, manufactured by Kyoeisha Chemical Co., Ltd.)

E4: Caprolactone-modified methacryloyloxyethyl phosphate (KAYAMER PM-21, manufactured by Nippon Kayaku Co., Ltd.)

—Compound Having Vinyl Group or Acryloyl Group in Second Liquid Composition—

F1: Triethylene glycol divinyl ether (manufactured by Tokyo Chemical Industry Co., Ltd.)

F'2: 2-(2-Vinyloxyethoxy)ethyl acrylate (manufactured by NIPPON SHOKUBAI CO., LTD.)

G1: Styrene (manufactured by Tokyo Chemical Industry Co., Ltd.)

G2: 4-Methylstyrene (manufactured by Tokyo Chemical Industry Co., Ltd.)

H1: Phenoxyethyl acrylate (manufactured by Tokyo Chemical Industry Co., Ltd.)

H2: Dipentaerythritol hexaacrylate (KAYARAD DPHA, manufactured by Nippon Kayaku Co., Ltd.)

I1: 4-Acryloylmorpholine (manufactured by Tokyo Chemical Industry Co., Ltd.)

I2: N-(2-Hydroxyethyl)acrylamide (manufactured by Tokyo Chemical Industry Co., Ltd.)

J1: N-Vinylcaprolactam (manufactured by Tokyo Chemical Industry Co., Ltd.)

J2: N-Vinylpyrrolidone (manufactured by NIPPON SHOKUBAI CO., LTD.)

The liquid composition sets thus prepared were subjected to the evaluations of "curability". "handleability", and "storability" as follows. The results are presented in Tables 1 to 3.

Evaluation 1: Curability and Handleability (Examples 1 to 22 and Comparative Example 1)

The first liquid composition was applied to a plastic substrate (polyethylene terephthalate film, ESTER FILM E5100 manufactured by TOYOBO CO., LTD.), having a thickness of 100 micrometer) with a wire bar. The amount of application of the first liquid composition was set to $1\times10^1$ grams per square meter. Next, the second liquid composition was dropped on a part of the surface of the applied first liquid composition with a microsyringe. The amount of drop of the second liquid composition was set to $1\times10^1$ gram per square meter. After a lapse of 1 minute, 10 minutes, and 60 minutes, the mixed part of both liquid compositions were touched with fingers to evaluate curability and handleability based on the following evaluation criteria. The evaluation was performed at a temperature of 23 degrees C. or higher and 25 degrees C. or lower.

Evaluation Criteria

A: The mixed part has been cured to the extent that nothing adheres to the fingers.

B: The mixed part has been cured, but the liquid composition slightly adheres to fingers.

C: The mixed part is liquid and has not been sufficiently cured.

F: Thickening and curing have started before the wire bar coating, making it difficult to form a uniform coating film.

Evaluation 2: Curability and Handleability (Examples 23 to 42 and Comparative Example 2)

The first liquid composition was applied to a plastic substrate (polyethylene terephthalate film, ESTER FILM E5100 manufactured by TOYOBO CO., LTD.), having a thickness of 100 micrometer) with a wire bar. The amount of application of the first liquid composition was set to $1\times10^1$ grams per square meter. Next, the second liquid composition (hermetically sealed in an aluminum pouch bag illustrated in FIG. 1 so as not to incorporate air bubbles, further housed in a plastic cartridge illustrated in FIG. 2) was discharged to a part of the surface of the applied first liquid composition to form a solid image (3 cm×3 cm) using an inkjet discharge device equipped with a circulation head (MH5421MF, manufactured by Ricoh Co., Ltd.). The amount of discharge of the second liquid composition was set to $1\times10^1$ gram per square meter. After a lapse of 1 minute, 10 minutes, and 60 minutes, the mixed part of both liquid compositions were touched with fingers to evaluate curability and handleability based on the following evaluation criteria. The evaluation was performed at a temperature of 23 degrees C. or higher and 25 degrees C. or lower without using the temperature control function of the circulation head.

Evaluation Criteria

A: The mixed part has been cured to the extent that nothing adheres to the fingers.

B: The mixed part has been cured, but the liquid composition slightly adheres to fingers.

C: The mixed part is liquid and has not been sufficiently cured.

F: Thickening and curing have started before the wire bar coating, making it difficult to form a uniform coating film.

Evaluation 3: Curability and Handleability (Examples 43 to 51 and Comparative Example 3)

The first liquid composition (hermetically sealed in an aluminum pouch bag illustrated in FIG. 1 so as not to incorporate air bubbles, further housed in a plastic cartridge illustrated in FIG. 2) was discharged to a plastic substrate (polyethylene terephthalate film, ESTER FILM E5100 manufactured by TOYOBO CO., LTD., having a thickness of 100 micrometer) to form a solid image (5 cm×5 cm) using an inkjet discharge device equipped with a circulation head (MH5421MF, manufactured by Ricoh Co., Ltd.). The amount of discharge of the first liquid composition liquid composition was set to $1\times10^1$ gram per square meter. Next, the second liquid composition (hermetically sealed in an aluminum pouch bag illustrated in FIG. 1 so as not to incorporate air bubbles, further housed in a plastic cartridge illustrated in FIG. 2) was discharged to a part of the surface of the discharged first liquid composition to form a solid image (3 cm×3 cm) using an inkjet discharge device equipped with a circulation head (MH5421MF, manufactured by Ricoh Co., Ltd.). The amount of discharge of the second liquid composition was set to $1\times10^1$ gram per square meter. After a lapse of 1 minute, 10 minutes, and 60 minutes, the mixed part of both liquid compositions were touched with fingers to evaluate curability and handleability (dischargibility) based on the following evaluation criteria. The evaluation was performed at a temperature of 23 degrees C. or higher and 25 degrees C. or lower without using the temperature control function of the circulation head.

Evaluation Criteria

A: The mixed part has been cured to the extent that nothing adheres to the fingers.

B: The mixed part has been cured, but the liquid composition slightly adheres to fingers.

C: The mixed part is liquid and has not been sufficiently cured.

F: A cured product has been formed in the tube connecting the cartridge containing the first liquid composition to the discharge head, making it difficult to discharge the liquid composition.

Evaluation 4: Storability (Examples 1 to 22 and Comparative Example 1)

First, 50 mL of the first liquid composition was put in a 110-mL container (e.g., a brown glass screw tube bottle No. 8 available from AS ONE Corporation) and sealed therein while being in contact with an air having a temperature of 25 degrees C. and a relative humidity of 50%. The container was then left to stand at 25 degrees C. for 1 day (24 hours), 7 days (168 hours), and 30 days (720 hours), and the viscosity change rate was determined from the following formula. Next, storability was evaluated based on the following evaluation criteria. The viscosity was measured at a temperature of 25 degrees C. using an E-type viscometer TVE-22L available from Toki Sangyo Co., Ltd.

Viscosity change rate (%)={(Viscosity after being left)−(Viscosity before being left)}/(Viscosity before being left)×100

Evaluation Criteria

A: The viscosity change rate is 5.0% or less.

B: The viscosity change rate is larger than 5.0%.

C: Viscosity has been increased beyond the measurement limit of the viscometer, or curing has been visually confirmed in at least part of the bottle.

F: Droplets of the first liquid composition scattered and attached to the wall surface of the container when the first liquid composition was put in to the container have been immediately cured.

TABLE 1

|  |  | Examples |  |  |  |  |  |  | Comp. Ex. |
|---|---|---|---|---|---|---|---|---|---|
|  |  | 1 | 2 | 3 | 4 | 5 | 6 | 7 | 1 |
| First Liquid Composition | A1: Diethyl methylene malonate | 99 |  |  |  |  |  | 20 |  |
|  | B1: Ethyl cyanoacrylate |  | 99 |  |  |  |  | 20 | 100 |
|  | B2: Isobutyl cyanoacrylate |  |  | 99 |  |  |  | 20 |  |
|  | B3: Ethoxyethyl cyanoacrylate |  |  |  | 99 |  |  | 20 |  |
|  | C1: Vinylidene cyanide |  |  |  |  | 99 |  | 15 |  |
|  | D1: Nitroethylene |  |  |  |  |  | 99 | 4 |  |
|  | E1: Acetic acid | 1 | 1 | 1 | 1 | 1 | 1 | 1 |  |
|  | E2: Lactic acid |  |  |  |  |  |  |  |  |
|  | E3: Methacryloyloxyethyl phosphate |  |  |  |  |  |  |  |  |
|  | E4: Caprolactone-modified methacryloyloxyethyl phosphate |  |  |  |  |  |  |  |  |
| Second Liquid Composition | F1: Triethylene glycol divinyl ether | 100 | 100 | 100 | 100 | 100 | 100 | 100 | 100 |
|  | F'2: 2-(2-Vinyloxyethoxy)ethyl acrylate |  |  |  |  |  |  |  |  |
|  | G1: Styrene |  |  |  |  |  |  |  |  |
|  | G2: 4-Methylstyrene |  |  |  |  |  |  |  |  |
|  | H1: Phenoxyethyl acrylate |  |  |  |  |  |  |  |  |
|  | H2: Dipentaerythritol hexaacrylate |  |  |  |  |  |  |  |  |
|  | I1: 4-Acryloylmorpholine |  |  |  |  |  |  |  |  |
|  | I2: N-(2-Hydroxyethyl)acrylamide |  |  |  |  |  |  |  |  |
|  | J1: N-Vinylcaprolactam |  |  |  |  |  |  |  |  |
|  | J2: N-Vinylpyrrolidone |  |  |  |  |  |  |  |  |
| Evaluation 1: Curability and Handleability | 1 minute later | B | A | A | A | A | B | A | F |
|  | 10 minutes later | A | A | A | A | A | B | A | F |
|  | 60 minutes later | A | A | A | A | A | A | A | F |
| Evaluation 4: Storability | 1 day later | A | A | A | A | A | A | A | F |
|  | 7 days later | B | B | B | B | C | B | B | F |
|  | 30 days later | B | C | C | C | C | B | C | F |

TABLE 1-continued

|  |  | Examples |  |  |  |  |  |  |  |  |  |  |  |  |  |
|---|---|---|---|---|---|---|---|---|---|---|---|---|---|---|---|
|  |  | 8 | 9 | 10 | 11 | 12 | 13 | 14 | 15 | 16 | 17 | 18 | 19 | 20 | 21 | 22 |
| First Liquid Composition | A1: Diethyl methylene malonate |  |  |  |  |  |  |  |  |  |  |  |  |  |  |  |
|  | B1: Ethyl cyanoacrylate | 95 | 90 | 99 | 95 | 90 | 99 | 95 | 90 | 99 | 95 | 90 | 90 | 90 | 90 | 90 |
|  | B2: Isobutyl cyanoacrylate |  |  |  |  |  |  |  |  |  |  |  |  |  |  |  |
|  | B3: Ethoxyethyl cyanoacrylate |  |  |  |  |  |  |  |  |  |  |  |  |  |  |  |
|  | C1: Vinylidene cyanide |  |  |  |  |  |  |  |  |  |  |  |  |  |  |  |
|  | D1: Nitroethylene |  |  |  |  |  |  |  |  |  |  |  |  |  |  |  |
|  | E1: Acetic acid | 5 | 10 |  |  |  |  |  |  |  |  |  |  |  |  |  |
|  | E2: Lactic acid |  |  | 1 | 5 | 10 |  |  |  |  |  |  |  |  |  |  |
|  | E3: Methacryloyloxyethyl phosphate |  |  |  |  |  | 1 | 5 | 10 |  |  |  |  |  |  |  |
|  | E4: Caprolactone-modified methacryloyloxyethyl phosphate |  |  |  |  |  |  |  |  | 1 | 5 | 10 | 10 | 10 | 10 | 10 |
| Second Liquid Composition | F1: Triethylene glycol divinyl ether | 100 | 100 | 100 | 100 | 100 | 100 | 100 | 100 | 100 | 100 | 100 |  |  |  | 40 |
|  | F'2: 2-(2-Vinyloxyethoxy)ethyl acrylate |  |  |  |  |  |  |  |  |  |  |  | 100 |  |  | 30 |
|  | G1: Styrene |  |  |  |  |  |  |  |  |  |  |  |  | 100 |  | 7 |
|  | G2: 4-Methylstyrene |  |  |  |  |  |  |  |  |  |  |  |  |  | 100 | 5 |
|  | H1: Phenoxyethyl acrylate |  |  |  |  |  |  |  |  |  |  |  |  |  |  | 2 |
|  | H2: Dipentaerythritol hexaacrylate |  |  |  |  |  |  |  |  |  |  |  |  |  |  | 2 |
|  | I1: 4-Acryloylmorpholine |  |  |  |  |  |  |  |  |  |  |  |  |  |  | 2 |
|  | I2: N-(2-Hydroxyethyl)acrylamide |  |  |  |  |  |  |  |  |  |  |  |  |  |  | 2 |
|  | J1: N-Vinylcaprolactam |  |  |  |  |  |  |  |  |  |  |  |  |  |  | 5 |
|  | J2: N-Vinylpyrrolidone |  |  |  |  |  |  |  |  |  |  |  |  |  |  | 5 |
| Evaluation 1: Curability and Handleability | 1 minute later | A | B | A | B | B | A | A | A | A | A | A | A | A | A | A |
|  | 10 minutes later | A | A | A | A | B | A | A | A | A | A | A | A | A | A | A |
|  | 60 minutes later | A | A | A | A | A | A | A | A | A | A | A | A | A | A | A |
| Evaluation 4: Storability | 1 day later | A | A | A | A | A | A | A | A | A | A | A | A | A | A | A |
|  | 7 days later | A | A | B | A | B | A | A | B | A | A | A | A | A | A | A |
|  | 30 days later | B | A | C | B | A | B | B | A | B | B | A | A | A | A | A |

TABLE 2-1

|  |  | Examples |  |  |  |  |  |  | Comp. Ex. |
|---|---|---|---|---|---|---|---|---|---|
|  |  | 23 | 24 | 25 | 26 | 27 | 28 | 29 | 2 |
| First Liquid Composition | A1: Diethyl methylene malonate | 99 |  |  |  |  |  | 20 |  |
|  | B1: Ethyl cyanoacrylate |  | 99 |  |  |  |  | 20 | 100 |
|  | B2: Isobutyl cyanoacrylate |  |  | 99 |  |  |  | 20 |  |
|  | B3: Ethoxyethyl cyanoacrylate |  |  |  | 99 |  |  | 20 |  |
|  | C1: Vinylidene cyanide |  |  |  |  | 99 |  | 15 |  |
|  | D1: Nitroethylene |  |  |  |  |  | 99 | 4 |  |
|  | E1: Acetic acid | 1 | 1 | 1 | 1 | 1 | 1 | 1 |  |
|  | E2: Lactic acid |  |  |  |  |  |  |  |  |
|  | E3: Methacryloyloxyethyl phosphate |  |  |  |  |  |  |  |  |
|  | E4: Caprolactone-modified methacryloyloxyethyl phosphate |  |  |  |  |  |  |  |  |
| Second Liquid Composition | F1: Triethylene glycol divinyl ether | 100 | 100 | 100 | 100 | 100 | 100 | 100 | 100 |
|  | F'2: 2-(2-Vinyloxyethoxy)ethyl acrylate |  |  |  |  |  |  |  |  |
|  | G1: Styrene |  |  |  |  |  |  |  |  |
|  | G2: 4-Methylstyrene |  |  |  |  |  |  |  |  |
|  | H1: Phenoxyethyl acrylate |  |  |  |  |  |  |  |  |
|  | H2: Dipentaerythritol hexaacrylate |  |  |  |  |  |  |  |  |
|  | I1: 4-Acryloylmorpholine |  |  |  |  |  |  |  |  |
|  | I2: N-(2-Hydroxyethyl)acrylamide |  |  |  |  |  |  |  |  |
|  | J1: N-Vinylcaprolactam |  |  |  |  |  |  |  |  |
|  | J2: N-Vinylpyrrolidone |  |  |  |  |  |  |  |  |

TABLE 2-1-continued

| Evaluation 2: Curability and Handleability | 1 minute later | B | A | A | A | A | B | A | F |
|---|---|---|---|---|---|---|---|---|---|
| | 10 minutes later | A | A | A | A | A | B | A | F |
| | 60 minutes later | A | A | A | A | A | A | A | F |

| | | Examples |
|---|---|---|
| | | 30 | 31 | 32 | 33 | 34 | 35 | 36 | 37 | 38 | 39 | 40 | 41 | 42 |
| First Liquid Composition | A1: Diethyl methylene malonate | | | | | | | | | | | | | |
| | B1: Ethyl cyanoacrylate | 95 | 90 | 99 | 95 | 90 | 99 | 95 | 90 | 99 | 95 | 90 | 90 | 90 |
| | B2: Isobutyl cyanoacrylate | | | | | | | | | | | | | |
| | B3: Ethoxyethyl cyanoacrylate | | | | | | | | | | | | | |
| | C1: Vinylidene cyanide | | | | | | | | | | | | | |
| | D1: Nitroethylene | | | | | | | | | | | | | |
| | E1: Acetic acid | 5 | 10 | | | | | | | | | | | |
| | E2: Lactic acid | | | 1 | 5 | 10 | | | | | | | | |
| | E3: Methacryloyloxyethyl phosphate | | | | | | 1 | 5 | 10 | | | | | |
| | E4: Caprolactone-modified methacryloyloxyethyl phosphate | | | | | | | | | 1 | 5 | 10 | 10 | 10 |
| Second Liquid Composition | F1: Triethylene glycol divinyl ether | 100 | 100 | 100 | 100 | 100 | 100 | 100 | 100 | 100 | 100 | 100 | 70 | 40 |
| | F'2: 2-(2-Vinyloxyethoxy)ethyl acrylate | | | | | | | | | | | | 30 | 30 |
| | G1: Styrene | | | | | | | | | | | | | 7 |
| | G2: 4-Methylstyrene | | | | | | | | | | | | | 5 |
| | H1: Phenoxyethyl acrylate | | | | | | | | | | | | | 2 |
| | H2: Dipentaerythritol hexaacrylate | | | | | | | | | | | | | 2 |
| | I1: 4-Acryloylmorpholine | | | | | | | | | | | | | 2 |
| | I2: N-(2-Hydroxyethyl)acrylamide | | | | | | | | | | | | | 2 |
| | J1: N-Vinylcaprolactam | | | | | | | | | | | | | 5 |
| | J2: N-Vinylpyrrolidone | | | | | | | | | | | | | 5 |
| Evaluation 2: Curability and Handleability | 1 minute later | A | B | A | B | B | A | A | A | A | A | A | A | A |
| | 10 minutes later | A | A | A | A | A | A | A | A | A | A | A | A | A |
| | 60 minutes later | A | A | A | A | A | A | A | A | A | A | A | A | A |

TABLE 3

| | | Examples | | | | | | | Comp. Ex. | Examples | |
|---|---|---|---|---|---|---|---|---|---|---|---|
| | | 43 | 44 | 45 | 46 | 47 | 48 | 49 | 3 | 50 | 51 |
| First Liquid Composition | A1: Diethyl methylene malonate | 99 | | | | | | 15 | | | |
| | B1: Ethyl cyanoacrylate | | 85 | | | | | 20 | 100 | 85 | 85 |
| | B2: Isobutyl cyanoacrylate | | | 90 | | | | 20 | | | |
| | B3: Ethoxyethyl cyanoacrylate | | | | 95 | | | 20 | | | |
| | C1: Vinylidene cyanide | | | | | 85 | | 10 | | | |
| | D1: Nitroethylene | | | | | | 85 | 5 | | | |
| | E1: Acetic acid | | | | | | | | | | |
| | E2: Lactic acid | | | | | | | | | | |
| | E3: Methacryloyloxyethyl phosphate | | | | | | | | | | |
| | E4: Caprolactone-modified methacryloyloxyethyl phosphate | 10 | 15 | 10 | 5 | 15 | 15 | 10 | | 15 | 15 |
| Second Liquid Composition | F1: Triethylene glycol divinyl ether | 100 | 100 | 100 | 100 | 100 | 100 | 100 | 100 | 70 | 40 |
| | F'2: 2-(2-Vinyloxyethoxy)ethyl acrylate | | | | | | | | | 30 | 30 |
| | G1: Styrene | | | | | | | | | | 7 |
| | G2: 4-Methylstyrene | | | | | | | | | | 5 |
| | H1: Phenoxyethyl acrylate | | | | | | | | | | 2 |
| | H2: Dipentaerythritol hexaacrylate | | | | | | | | | | 2 |

TABLE 3-continued

|  |  | Examples |  |  |  |  |  |  | Comp. Ex. | Examples |  |
| --- | --- | --- | --- | --- | --- | --- | --- | --- | --- | --- | --- |
|  |  | 43 | 44 | 45 | 46 | 47 | 48 | 49 | 3 | 50 | 51 |
|  | I1: 4-Acryloylmorpholine |  |  |  |  |  |  |  |  |  | 2 |
|  | I2: N-(2-Hydroxyethyl)acrylamide |  |  |  |  |  |  |  |  |  | 2 |
|  | J1: N-Vinylcaprolactam |  |  |  |  |  |  |  |  |  | 5 |
|  | J2: N-Vinylpyrrolidone |  |  |  |  |  |  |  |  |  | 5 |
| Evaluation 3: | 1 minute later | B | A | A | A | A | B | A | F | A | A |
| Curability and | 10 minutes later | A | A | A | A | A | B | A | F | A | A |
| Handleability | 60 minutes later | A | A | A | A | A | A | A | F | A | A |

In all the Examples, it was confirmed that the cured product was spontaneously formed as the first liquid composition and the second liquid composition come into contact with each other. At that time, no special emission device was used other than general lighting used in a normal indoor environment, and no external energy applying device such as a heater for heating to room temperature or higher was used.

Further, it is clear from Examples 1 to 7 that the curability is good when the various compounds represented by the general formula (1) are used alone or in combination. In particular, it was found that the curability is much better when a compound having cyano group as an electron-withdrawing functional group is used. In particular, the cyanoacrylate compound is a widely used material also known as a main component of instant adhesives and is easily available as a mass-produced industrial product. The cyanoacrylate compound is also preferred for its low toxicity and low odor.

On the other hand, it is clear from Comparative Example 1 that, when the first liquid composition is free of acidic substance, the first liquid composition immediately undergoes curing, which makes it difficult to form a uniform coating film. By contrast, in all the Examples, when the first liquid composition contains an acidic substance, the first liquid composition is suppressed from undergoing curing, which makes it possible to form a uniform coating film.

Examples 8 to 12 indicate that the curability tends to decrease as the content of the acidic substance increases, but Examples 13 to 18 indicate that the decrease in curability is suppressed when the acidic substance includes methacryloyl group as a polymerizable functional group.

Some acidic substances have peculiar irritating odor. Irritating odor was actually confirmed in Examples 1 to 9, but almost no irritating odor was confirmed in Examples 10 to 18. This is because, since the vapor pressure of acetic acid is 2,000 Pa (at 25 degrees C., literature value), acetic acid easily evaporates at room temperature with gradually losing its weight. On the other hand, since the vapor pressure of lactic acid is 0.4 Pa (at 20 degrees C., literature value), lactic acid does not evaporate so much at room temperature and does not gradually lose its weight. Therefore, no irritating odor was confirmed. The intensity of odor is related to the volatility of the acidic substance. Depending on the application, odor may be a concern. Therefore, it is preferable to select an appropriate acidic substance depending on the situation.

Further, it is clear from Examples 18 to 22 that the curability is good when the various compounds having vinyl group or acryloyl group are used alone or in combination in the second liquid composition.

In addition, in Examples 22 to 24, strong odor derived from the styrene compounds was confirmed. In a case in which this odor is not preferred, another type of compound having vinyl group or acryloyl group, other than the styrene compound, is preferably used.

The same tendency was observed in "Evaluation 2: Curability and Handleability" as in "Evaluation 1: Curability and Handleability". In comparison between Example 34 and Example 12, Example 34 is superior in curability although the first liquid composition and the second liquid composition have the same formulation. This may be because the second liquid composition was applied by an inkjet method.

The same tendency was observed in "Evaluation 3: Curability and Handleability" as in "Evaluation 1: Curability and Handleability" and "Evaluation 2: Curability and Handleability".

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. A liquid composition set comprising:
   a first liquid composition comprising:
      a compound represented by general formula (1)

General Formula (1)

where X and Y each independently represent a functional group, and at least one of X and Y represents an electron-withdrawing functional group; and
      an acidic substance; and
   a second liquid composition comprising:
      a compound having vinyl group or acryloyl group.

2. The liquid composition set according to claim 1, wherein the liquid composition set cures when the first liquid composition and the second liquid composition come into contact with each other.

3. The liquid composition set according to claim 1, wherein the electron-withdrawing functional group includes at least one member selected from the group consisting of cyano group, nitro group, carboxyl group, carboxylate group, and carbonyl group.

4. The liquid composition set according to claim 3, wherein the electron-withdrawing functional group includes cyano group.

5. The liquid composition set according to claim 1, wherein the compound represented by the general formula (1) is a cyanoacrylate compound.

6. The liquid composition set according to claim 1, wherein the acidic substance includes at least one member selected from the group consisting of hydrochloric acid, nitric acid, sulfuric acid, sulfur dioxide, a sultone compound, a carboxylic acid compound, a sulfonic acid compound, and a phosphoric acid compound.

7. The liquid composition set according to claim 1, wherein the acidic substance has a polymerizable functional group.

8. The liquid composition set according to claim 1, wherein the acidic substance has methacryloyl group.

9. The liquid composition set according to claim 1, wherein a vapor pressure of the acidic substance is 0.4 Pa or less at 20 degrees C.

10. The liquid composition set according to claim 1, wherein the second liquid composition further comprises at least one member selected from the group consisting of a vinyl ether compound, an N-vinyl compound, an acrylate compound, and an acrylamide compound.

11. The liquid composition according to claim 1, wherein, when 50 mL of the first liquid composition is sealed in a 110-mL container while being in contact with an air having a temperature of 25 degrees C. and a relative humidity of 50%, then the container is left to stand at 25 degrees C. for one day, a viscosity change rate of the first liquid composition, calculated by the following formula, is 5.0% or less:

Viscosity change rate (%)={(Viscosity after being left)−(Viscosity before being left)}/(Viscosity before being left)×100.

12. The liquid composition set according to claim 1, wherein the first liquid composition is to be discharged by an inkjet method.

13. The liquid composition set according to claim 1, wherein the second liquid composition is to be discharged by an inkjet method.

14. The liquid composition set according to claim 1, wherein each of the first liquid composition and the second liquid composition is substantially free of polymerization initiator.

* * * * *